(12) United States Patent
Abbott et al.

(10) Patent No.: US 9,206,044 B2
(45) Date of Patent: Dec. 8, 2015

(54) PROCESS FOR INCREASING HYDROGEN CONTENT OF SYNTHESIS GAS

(71) Applicant: JOHNSON MATTHEY PUBLIC LIMITED COMPANY, London (GB)

(72) Inventors: Peter Edward James Abbott, Eaglescliffe (GB); Gary Bevan Combes, Eaglescliffe (GB); Richard James Beavis, Wokingham (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/355,630

(22) PCT Filed: Oct. 10, 2012

(86) PCT No.: PCT/GB2012/052506
§ 371 (c)(1),
(2) Date: May 1, 2014

(87) PCT Pub. No.: WO2013/072660
PCT Pub. Date: May 23, 2013

(65) Prior Publication Data
US 2014/0264178 A1 Sep. 18, 2014

(30) Foreign Application Priority Data

Nov. 18, 2011 (GB) .................................. 1119960.1

(51) Int. Cl.
*C01B 3/38* (2006.01)
*C01B 3/16* (2006.01)
*C10K 3/04* (2006.01)

(52) U.S. Cl.
CPC ... *C01B 3/16* (2013.01); *C10K 3/04* (2013.01); *C01B 2203/0288* (2013.01);
(Continued)

(58) Field of Classification Search
CPC .......................... C01B 3/16; C01B 2203/0288

USPC ........................................................ 252/373
See application file for complete search history.

(56) References Cited

U.S. PATENT DOCUMENTS 3,666,682 A 5/1972 Muenger
3,825,501 A 7/1974 Muenger
(Continued)

FOREIGN PATENT DOCUMENTS

CN 101955153 A 1/2011
GB 2474164 A 4/2011
(Continued)

OTHER PUBLICATIONS

British Search Report, dated Feb. 28, 2012, from corresponding British application.
(Continued)

*Primary Examiner* — Paul Wartalowicz
(74) *Attorney, Agent, or Firm* — Young & Thompson

(57) ABSTRACT

Process for increasing the hydrogen content of a synthesis gas containing one or more sulphur compounds, the synthesis gas including hydrogen, carbon oxides and steam, and having a ratio defined as $R=(H_2-CO_2)/(CO+CO_2) \leq 0.6$ and a steam to carbon monoxide ratio $\leq 1.8$, includes the steps of (i) adjusting the temperature of the synthesis gas; (ii) passing at least a portion of the heated synthesis gas adiabatically through a first bed of sulphur-tolerant water-gas shift catalyst disposed in a first shift vessel at a space velocity $\geq 12,500$ hour$^{-1}$ to form a pre-shifted gas stream; and (iii) forming a shifted gas stream by subjecting at least a portion of the pre-shifted gas stream to a second stage of water-gas shift in a second shift vessel containing a second bed of sulphur-tolerant water-gas shift catalyst that is cooled in heat exchange with a gas stream including the synthesis gas.

22 Claims, 2 Drawing Sheets

Figure 1:
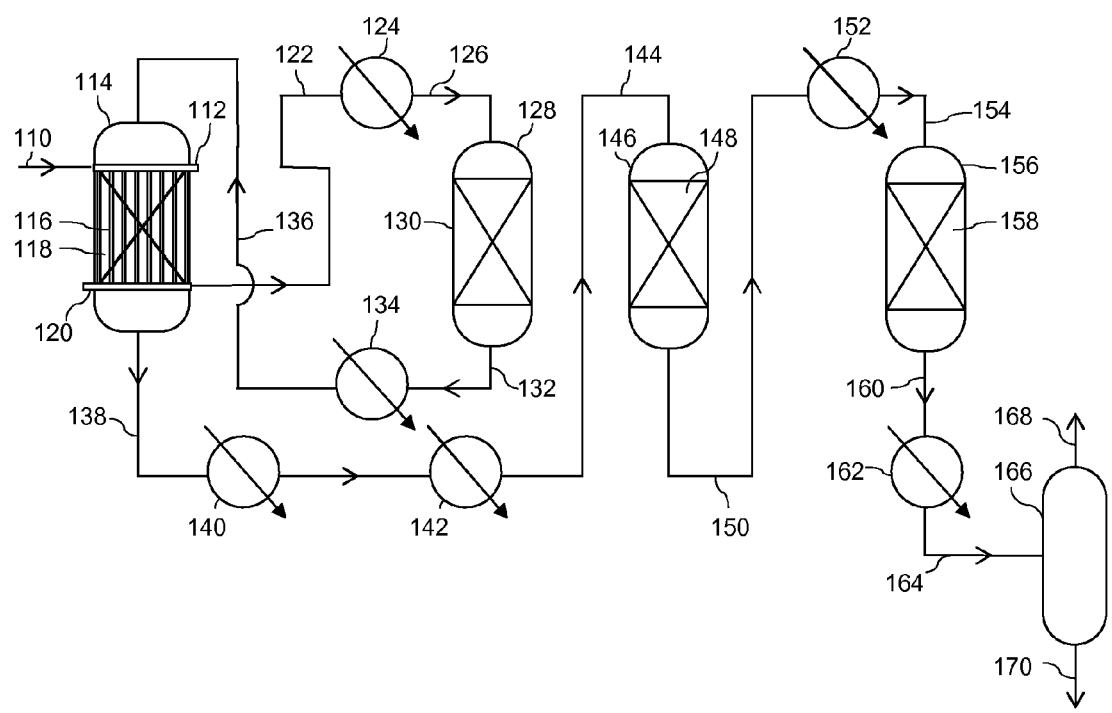

(52) U.S. Cl.
CPC .............. *C01B 2203/0294* (2013.01); *C01B 2203/0415* (2013.01); *C01B 2203/0475* (2013.01); *C01B 2203/0485* (2013.01); *C01B 2203/0495* (2013.01); *C01B 2203/0883* (2013.01); *C01B 2203/1047* (2013.01)

(56) References Cited

U.S. PATENT DOCUMENTS

| | | | |
|---|---|---|---|
| 4,721,611 A * | 1/1988 | Pinto et al. | 423/655 |
| 5,464,606 A | 11/1995 | Buswell et al. | |
| 2001/0024632 A1 | 9/2001 | Ward | |
| 2002/0141938 A1* | 10/2002 | Ruettinger et al. | 423/652 |
| 2004/0082669 A1* | 4/2004 | Ruettinger et al. | 518/703 |
| 2007/0137107 A1* | 6/2007 | Barnicki | 48/198.3 |
| 2010/0040527 A1 | 2/2010 | Randhava et al. | |

FOREIGN PATENT DOCUMENTS

| | | | |
|---|---|---|---|
| WO | 2010/013026 A1 | 2/2010 | |
| WO | WO 2010/106148 * | 9/2010 | ............... C01B 3/16 |
| WO | 2011/055132 A1 | 5/2011 | |

OTHER PUBLICATIONS

British Search Report, dated Feb. 27, 2013, from corresponding British application.
International Search Report, dated Jan. 25, 2013, from corresponding British application.
British Search Report, dated Feb. 28, 2013, from corresponding British application.

* cited by examiner

PROCESS FOR INCREASING HYDROGEN CONTENT OF SYNTHESIS GAS

PROCESS

This invention relates to a process for increasing the hydrogen content of a synthesis gas, in particular increasing the hydrogen content of a synthesis gas generated from a carbonaceous feedstock.

Synthesis gas, also termed syngas, comprising hydrogen and carbon oxides (CO and $CO_2$) may be generated by a gasification of carbonaceous feedstocks such as coal, petroleum coke or other carbon-rich feedstocks using oxygen or air and steam at elevated temperature and pressure. Generally, the resulting synthesis gas is hydrogen deficient and to increase the concentration of hydrogen, it is necessary to subject the raw synthesis gas to the water-gas-shift reaction by passing it, in the presence of steam, over a suitable water-gas shift catalyst at elevated temperature and pressure. The $CO_2$ that is formed may then be removed in a downstream gas washing unit to give a hydrogen rich product gas. The synthesis gas generally contains one or more sulphur compounds and so must be processed using sulphur-tolerant catalysts, known as "sour shift" catalysts. The reaction may be depicted as follows;

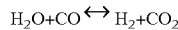

$$H_2O + CO \leftrightarrow H_2 + CO_2$$

This reaction is exothermic, and conventionally it has been allowed to run adiabatically, with control of the exit temperature governed by feed gas inlet temperature and composition.

Furthermore, where it is required that only fractional shift conversion is needed to achieve a target gas composition, this is conventionally achieved by by-passing some of the synthesis gas around the reactor.

Side reactions can occur, particularly methanation, which is usually undesirable. To avoid this, the shift reaction requires considerable amounts of steam to be added to ensure the desired synthesis gas composition is obtained with minimum formation of additional methane. The cost of generating steam can be considerable and therefore there is a desire to reduce the steam addition where possible.

WO2010/106148 discloses a process to prepare a hydrogen rich gas mixture from a halogen containing gas mixture comprising hydrogen and at least 50 vol. % carbon monoxide, on a dry basis, by contacting the halogen containing gas mixture with water having a temperature of between 150 and 250 DEG C. to obtain a gas mixture poor in halogen and having a steam to carbon monoxide molar ratio of between 0.2:1 and 0.9:1 and subjecting said gas mixture poor in halogen to a water-gas shift reaction wherein part or all of the carbon monoxide is converted with the steam to hydrogen and carbon dioxide in the presence of a catalyst as present in one fixed bed reactor or in a series of more than one fixed bed reactors and wherein the temperature of the gas mixture as it enters the reactor or reactors is between 190 and 230 degrees C. The space velocity in the water-gas shift reactor is preferably between 6000-9000 $h^{-1}$. In the single Example a space velocity of 8000 $hr^{-1}$ was used. Because this process operates at a low steam to CO ratio and at low inlet temperature it is limited in utility to certain types of gasifier and requires a relatively high catalyst volume. Therefore there is a need for a process operating at a low steam to CO ratio that requires less catalyst and which has broader utility.

WO2010/013026 discloses a process for increasing the hydrogen content of a synthesis gas containing one or more sulphur compounds, comprising the steps of (i) heating the synthesis gas and (ii) passing at least part of the heated synthesis gas and steam through a reactor containing a sour shift catalyst, wherein the synthesis gas is heated by passing it through a plurality of tubes disposed within said catalyst in a direction co-current to the flow of said synthesis gas through the catalyst. The resulting synthesis gas may be passed to one or more additional reactors containing sour shift catalyst to maximise the yield of hydrogen production, or used for methanol production, for the Fischer-Tropsch synthesis of liquid hydrocarbons or for the production of synthetic natural gas. While effective, we have found that in some cases with a cooled first shift reactor that the catalyst temperature profile may be too high, leading to undesirable side-reactions.

We have found that the disadvantages of the previous processes may be overcome using a pre-shift stage operated at a high gas hourly space velocity in combination with a downstream gas-cooled shift vessel.

Accordingly, the invention provides a process for increasing the hydrogen content of a synthesis gas containing one or more sulphur compounds, said synthesis gas comprising hydrogen, carbon oxides and steam, and having a ratio, R, defined as $R=(H_2-CO_2)/(CO+CO_2) \leq 0.6$ and a steam to carbon monoxide ratio $\leq 1.8$, comprising the steps of (i) heating the synthesis gas, (ii) passing at least a portion of the heated synthesis gas adiabatically through a first bed of sulphur-tolerant water-gas shift catalyst disposed in a first shift vessel at a space velocity $\geq 12,500$ $hour^{-1}$ to form a pre-shifted gas stream, and (iii) forming a shifted gas stream by subjecting at least a portion of the pre-shifted gas stream to a second stage of water-gas shift in a second shift vessel containing a second bed of sulphur-tolerant water-gas shift catalyst that is cooled in heat exchange with a gas stream comprising the synthesis gas.

In the present invention the synthesis gas comprising hydrogen and carbon oxides and containing one or more sulphur compounds may be produced by any method although it is particularly suited to synthesis gas produced by gasification of a carbonaceous feedstock at elevated temperature and pressure. Any known gasification technology may be used. The carbonaceous feedstock may be coal, petroleum coke or another carbon-rich feedstock.

Preferably the carbonaceous feedstock is a coal. In coal gasification, a coal powder or aqueous slurry may be partially combusted in a gasifier in a non-catalytic process using oxygen or air and in the presence of steam at pressures up to about 85 bar abs and exit temperatures up to about 1450° C., preferably up to about 1400° C., to generate a raw synthesis gas comprising hydrogen and carbon oxides (carbon monoxide and carbon dioxide) and containing one or more sulphur compounds such as hydrogen sulphide and carbonyl sulphide.

The R ratio, defined as $R=(H_2-CO_2)/(CO+CO_2)$, in the synthesis gas feed is $\leq 0.6$ and is preferably in the range 0.1 to 0.6, more preferably 0.2 to 0.6. R may readily be calculated from the molar quantities of the components in the synthesis gas feed.

Before the synthesis gas is subjected to the water-gas shift reaction, it is preferably cooled, optionally filtered, then washed to remove particulates such as coal ash.

The synthesis gas comprises one or more sulphur compounds, such as hydrogen sulphide. In order that the water-gas shift catalysts remain suitably sulphided, the sulphur content of the synthesis gas fed to the water-gas shift catalyst is desirably >250 ppm.

If the synthesis gas does not contain enough steam for the water-gas shift process, steam may be added to the synthesis gas, for example by live steam addition or saturation or a combination of these. Steam may be added to the synthesis gas before or after heating in the second vessel. The steam to carbon monoxide ratio (i.e. molar ratio) of the synthesis gas mixture fed to the first water-gas shift catalyst should be ≤1.8 and preferably is in the range 0.2 to 1.8, more preferably 0.7 to 1.8. In some embodiments, it may be desirable to operate with a ratio in the range 0.95 to 1.8.

The water-gas shift catalyst used in the shift vessels may be any suitably stable and active water-gas shift catalyst. The synthesis gas contains one or more sulphur compounds and so the water-gas shift catalyst should remain effective in the presence of these compounds. In particular so-called "sour shift" catalysts may be used, in which the active components are metal sulphides. Preferably the water-gas shift catalyst comprises a supported cobalt-molybdenum catalyst that forms molybdenum sulphide in-situ by reaction with hydrogen sulphide present in the synthesis gas stream. The Co content is preferably 2-8% wt and the Mo content preferably 5-20% wt. Alkali metal promoters may also be present at 1-10% wt. Suitable supports comprise one or more of alumina, magnesia, magnesium aluminate spinel and titania. The catalysts may be supplied in oxidic form, in which case they require a sulphiding step, or they may be supplied in a pre-sulphided form. Particularly preferred sour shift catalysts are supported cobalt-molybdate catalysts such as KATALCO™ K8-11 available from Johnson Matthey PLC, which comprises about 3% wt. CoO and about 10% wt. $MoO_3$ supported on a particulate support containing magnesia and alumina.

It is desirable to adjust the temperature of the synthesis gas so that the temperature within the first water-gas shift vessel is maintained within suitable operating conditions. For instance, after the synthesis gas is washed, thereby significantly cooling it, it may be advantageous to preheat the synthesis gas passing to the vessel. A suitable heat exchanger can be placed on the feed synthesis gas stream. According to the particular details of the process, suitable media for heat exchange with the inlet gas may be, for example, another gas stream at a different temperature, steam or water. Furthermore, using such a heat exchanger, with a bypass provided around it, gives the ability to control the inlet temperature to the catalyst bed, independently of variation in other parameters.

In the present invention, at least part of the temperature adjustment of the synthesis gas before it is fed to the first shift vessel includes heating it by passing the synthesis gas through heat exchange apparatus, such as a plurality of tubes, coils or plates, disposed within the second catalyst bed. The synthesis gas is at a lower temperature than the reacting pre-shifted gas stream and accordingly the synthesis gas acts as a cooling medium thereby removing heat from the second catalyst bed. A preferred temperature for the synthesis gas fed to the heat exchange apparatus within the second catalyst bed is in the range 150 to 250° C. The synthesis gas is heated as it passes through the heat exchange apparatus in the second vessel. The heated synthesis gas recovered from the heat exchange apparatus in the second vessel may be further heated or cooled to provide the desired inlet temperature for the first shift vessel.

The inlet temperature for the first bed of water-gas shift catalyst may be in the range 190 to 350° C., preferably 200 to 330° C.

If desired, the heated synthesis gas recovered from the heat exchange apparatus in the second vessel may be divided into first and second streams, with the first stream passed over the first bed of shift catalyst and the second stream by-passing the first bed of shift catalyst, thereby forming a catalyst by-pass stream. In addition or alternatively, it may be desirable, upstream of the catalyst of the second shift vessel, to divide the synthesis gas into first and second streams, with the first stream fed to the second shift vessel where it is heated, and the second stream by-passing the second shift vessel, thereby forming a vessel by-pass stream. The catalyst by-pass stream may if desired be combined with the vessel by-pass stream, thereby forming a combined by-pass stream. The combined by-pass stream is preferably ≤40% by volume of the total synthesis gas feed.

The by-pass stream may be fed to one or more of the pre-shifted gas stream, the shifted gas stream, or separately to downstream processes. Utilising a vessel by-pass around the second shift stage or a combined by-pass stream around both first and second stage shift vessels is useful when it is desired to precisely control the overall extent of CO conversion for the total synthesis gas feed, e.g. for making synthesis gas of a specific R ratio, as for methanol synthesis. Especially useful is a use of a second vessel by-pass, because this also allows better control of the gas flow, so that the temperature profile in the pre-shift vessel is unaffected by control of the extent of CO conversion.

If desired, a by-pass stream may be subjected to a carbonyl sulphide (COS) hydrolysis step by passing the stream over a COS hydrolysis catalyst, such as a particulate alumina or titania based catalyst, disposed in a suitable vessel. In this step, the COS in the by-pass stream is hydrolysed by steam to form $H_2S$, which may be easier to remove in downstream processes. In such a COS hydrolysis step, essentially no water-gas shift reaction takes place.

The synthesis gas and steam mixture is passed at elevated temperature and pressure, preferably temperatures in the range 190 to 420° C. more preferably 200 to 400° C., and pressure up to about 85 bar abs, over the first bed of water-gas shift catalyst. The flow-rate of synthesis gas containing steam should be such that the gas hourly space velocity (GHSV) is ≥12,500 $hour^{-1}$, and is preferably ≥15,500 $hour^{-1}$, more preferably ≥17,500 $hour^{-1}$, most preferably ≥20,000 $hour^{-1}$.

The water-gas shift reaction occurs, consuming carbon monoxide and steam and forming carbon dioxide and hydrogen. Under the conditions, only a portion of the carbon monoxide and steam are consumed and so the pre-shifted gas stream comprises hydrogen, carbon monoxide, carbon dioxide and steam that may be further reacted in the one or more further stages of water-gas shift. Under the reaction conditions it is desirable to convert 10 to 40% (by moles) of the carbon monoxide present in the synthesis gas to carbon dioxide over the first bed of water-gas shift catalyst disposed in the first shift vessel. The first shift vessel may thus be termed a pre-shift vessel.

The pre-shift vessel operates adiabatically without applied cooling and so the reacting gases are heated as they pass through the first shift vessel. Thus some cooling of the pre-shifted gas may be desirable before passing the pre-shifted gas stream to the second stage of water-gas shift.

At least a portion of the pre-shifted synthesis gas from the reactor containing the first bed of sulphur-tolerant water-gas shift catalyst is fed to the second water-gas shift stage. In the second stage the pre-shifted gas stream is further reacted over a second bed of sulphur-tolerant water-gas shift catalyst. The second bed of catalyst may be the same or different to the first bed but is preferably also a supported cobalt-molybdenum water-gas shift catalyst. The bed is cooled by heat exchange with a gas stream comprising the synthesis gas fed to the first shift vessel. The gas stream comprising the synthesis gas may be passed through tubes, coils or plates. Axial or radial flow vessels may be used. Axial flow vessels comprising a plurality of vertical tubes though which the gas stream comprising synthesis gas flows are preferred. Where tubes are used, the synthesis gas may be passed through the tubes in the second shift vessel in a direction that is counter-current or co-current to the flow of the pre-shifted gas stream through the vessel. Axial, co-current flow is preferred. Where tubes are used, heat transfer enhancement devices may be used inside the tubes, for example core-rods or structures which increase the turbulence of the flowing gas within the tubes If desired, additional steam may be added to the pre-shifted gas stream before the second stage of water-gas shift.

The second shift vessel is preferably operated at a temperature in the range 250 to 420° C., more preferably 340 to 400° C. The gas-hourly space velocity in the second bed of sulphur-tolerant water-gas shift catalyst may be $\geq 5000\ h^{-1}$, preferably $\geq 6000\ h^{-1}$ and is more preferably in the range $6000\ h^{-1}$ to $12000\ h^{-1}$, most preferably $6000\ h^{-1}$ to $10000\ h^{-1}$.

The resulting shifted gas stream from the second water-gas shift vessel may be used in downstream processes for the production of methanol, dimethylether (DME), Fischer-Tropsch (FT) liquids or synthetic natural gas (SNG). Where a higher degree of water-gas shift is required, for example when making hydrogen or a low carbon content fuel for combustion in a gas turbine, additional water-gas shift steps may be performed. In such cases, one or more further water-gas shift stages, which may be uncooled or cooled and operated in series or parallel, may be used. Preferably one or two further stages of adiabatic water-gas shift are used in series, with optional cooling before each stage, to maximise CO conversion in the shifted gas stream.

The present invention has a number of distinct advantages over the prior art processes. Heat generation in each of the first two shift stages is less and therefore it is easier to control the peak temperature in each bed, and thus minimise the formation of by-products. As a result of using the cooled second shift vessel, a more optimal water-gas shift reaction profile is followed without the use of excessive heat transfer area. This permits a reduction in the total volume of catalyst or a greater CO conversion achieved with the same catalyst volume. Vessel and/or tube inlet temperatures can be varied over a wide range in order to accommodate varying catalyst reaction activity, without the risk of high peak temperatures.

In the present invention, the feed synthesis gas is preheated, while cooling the catalyst in the second shift reactor. This is in contrast to a process scheme with sequential adiabatic reactors, where the whole feed gas stream must be heated in a separate heat exchanger to the inlet temperature to the first shift reactor. Hence, the use of a Gas Cooled Reactor in this invention reduces the equipment count by combining the preheating duty within a shift reactor.

The process of the present invention does not rely on having a very low H2O/CO ratio in the feed gas to limit the theoretical equilibrium CO conversion and associated temperature rise. It is also applicable to a wide range of gasifier types, including those with a radiant cooling and quench section, which therefore have a higher, involuntary water content and are unsuitable for utilising the 'steam deficient' shift methodology set out in the aforesaid WO2010/106148. In order to generate a hydrogen-rich synthesis gas the process preferably further comprises the steps of:
   (i) cooling a shifted gas stream or a mixture of the shifted gas stream and a bypass stream, to below the dew point to condense water,
   (ii) separating the resulting condensate therefrom to form a dry gas stream,
   (iii) feeding the dry gas stream to a gas-washing unit operating by means of counter-current solvent flow, to produce a product synthesis gas and
   (iv) collecting the product synthesis gas from the washing unit.

The shifted gas stream may be subjected to these steps alone to form a dry shifted gas stream, or as a mixture with a bypass stream. Alternatively, a bypass stream may be separately subjected to these steps to form a dry un-shifted by-pass stream, which is fed to the same or a separate gas washing unit. Where the dry un-shifted gas is fed to the same gas washing unit, preferably this un-shifted stream is fed to the gas washing unit such that the solvent flowing through said unit contacts first with the dry un-shifted synthesis gas and then the dry shifted gas stream.

The cooling step may be performed by heat exchange, e.g. with cold water, to cool the gases to below the dew point at which steam condenses. The resulting condensates, which comprise water and some contaminants, are separated.

The gases may be further cooled and dried, e.g. by means of chilled solvent, and then fed to a gas-washing unit operating by means of counter-current solvent flow. In the gas-washing unit, also known as an acid-gas removal (AGR) unit, a solvent suitable for the dissolution/absorption of carbon dioxide flows counter-current to gas flowing through the unit and dissolves/absorbs carbon dioxide present in the gas stream. A small quantity of other gas components in the gas stream, particularly carbon monoxide, will also be co-absorbed. Contaminants present in the gas stream that may poison downstream catalysts, e.g. sulphur compounds such as $H_2S$ & COS, may also be removed to differing extents. Using AGR, $CO_2$ levels may be reduced to below 5 mole %, on a dry gas basis.

Suitable solvents for absorbing $CO_2$ are physical solvents, including methanol, other alcohol or glycol products, such as glycols or polyethylene glycol ethers, and propylene carbonate, and chemical solvents, such as activated alkanolamines. Methanol is the preferred solvent where a downstream catalyst is being used. Methanol may be used at temperatures in the range −30 to −70° C. and at elevated pressures up to about 75 bar abs.

A gas-washing unit may comprise, for example, a column having a solvent inlet near the top and a solvent outlet near the bottom, down which a solvent suitable for the dissolution/absorption of carbon dioxide flows over one or more perforate trays or packing. The gases passing up through the column contact the solvent and carbon dioxide is dissolved/absorbed. The gases may leave the column near the top via a synthesis gas outlet. The synthesis gas is cold and may be used to cool the feed gases to the gas-washing unit using suitable heat exchange means such as a spiral wound heat exchanger. In one embodiment, the dry by-pass synthesis gas mixture and dry shifted gas stream are fed separately to the unit, with the separate feeds arranged such that that the solvent contacts first with the dry by-pass synthesis gas mixture and then the dry shifted gas stream. This is in contrast to previous processes, where a synthesis gas mixture is fed to a gas-washing unit so that the solvent contacts the gas mixture in one stage. We have found that by separately feeding the two different gas streams to the unit such that that the solvent contacts first with the dry gas mixture and then the dry shifted gas stream, the efficiency of the process is improved, which offers the potential for reduced CO co-absorption and an increased potential for methanol or liquid hydrocarbon production from a given quantity of synthesis gas.

The process is desirably operated such that the synthesis gas collected from the gas-washing unit has an R ratio suited to the downstream use, such as methanol or DME production, FT hydrocarbon production or SNG production. For the production of methanol or hydrocarbons, the desired stoichiometry ratio, R, of the product synthesis gas is preferably in the range 1.4 to 2.5. For generating synthetic natural gas (SNG)

the range is preferably in the range 2.8 to 3.3. Alternatively, the sour shift reactor, additional downstream sour shift stage or stages, and gas-washing stage may be operated such that the synthesis gas collected from the gas-washing unit is hydrogen rich, with minimal CO and $CO_2$ content, where this is desirable. Such hydrogen-rich gas streams may be used in ammonia synthesis, for hydrogenation purposes, for chemicals synthesis or power generation by combustion in a gas turbine with or without additional hydrocarbon fuels.

Figure 2:
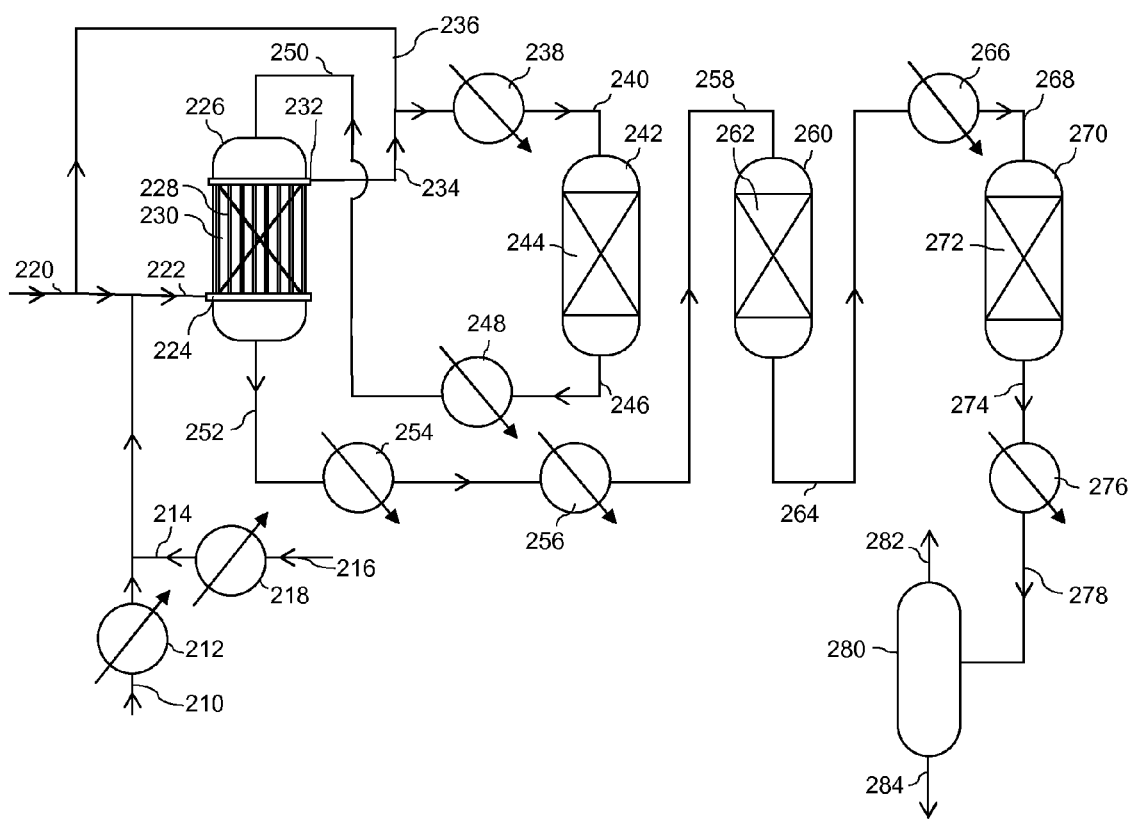

The invention is further illustrated by reference to the accompanying drawings in which;

FIG. 1 is a depiction of one embodiment according to the present invention suitable for feed from a gasifier having a radiant cooling and quench section producing a steam-containing synthesis gas with a steam:CO ratio in the range 1.3-1.4 and operating with co-current flow through tubes disposed within the second vessel, and FIG. 2 is a depiction of a further embodiment suitable for feed from gasifier producing a steam-containing synthesis gas with a steam:CO ratio in the range 0.20-0.30 and operating with counter-current flow through tubes disposed the second vessel.

In FIG. 1, a synthesis gas 110 containing one or more sulphur compounds and steam with a steam:CO ratio in the range 1.3-1.4 is fed to a distributor 112 disposed within a second sour shift vessel 114. The distributor is connected to a plurality of tubes 116 that pass vertically through a bed of particulate Co/Mo sour shift catalyst 118. The synthesis gas is able to pass from the distributor vertically through the tubes where it is heated thereby cooling the reactant gas in the catalyst bed 118. The tubes are connected to a collector 120 at the other end of the tubes that collects heated synthesis gas.

The heated synthesis gas is fed via line 122 to heat exchanger 124 where its temperature is adjusted to the desired inlet temperature for the first water-gas shift catalyst. The temperature adjusted synthesis gas is fed from exchanger 124 via line 126 to a pre-shift vessel 128 containing a first fixed bed of particulate sulphided Co/Mo sulphur-tolerant water-gas shift catalyst 130. The flow of synthesis gas containing steam is controlled such that the gas hourly space velocity in the first bed of catalyst is >12,500 $h^{-1}$. The synthesis gas containing steam reacts over the catalyst to form carbon dioxide and hydrogen. The pre-shift vessel is operated adiabatically without cooling and the exothermic reactions heat the resulting pre-shifted gas stream.

The pre-shifted gas stream is recovered from the vessel 128 via line 132 and passed through heat exchanger 134 where it is cooled.

The cooled pre-shifted gas stream is then fed via line 136 to the inlet of the second water-gas shift vessel 114 containing the second fixed bed of particulate sulphided Co/Mo sulphur-tolerant water-gas shift catalyst 118. If desired, additional steam may be added to the pre-shifted gas mixture 132 upstream of vessel 114 (not shown). The pre-shifted gas mixture is passed over the water-gas shift catalyst 118 further increasing the hydrogen content of the synthesis gas. The bed of catalyst 118 is cooled in heat exchange with the synthesis gas 110 passing through the tubes 116 in a direction co-current to the flow of pre-shifted gas stream through the vessel 114. A hydrogen-enriched shifted gas stream is recovered from the outlet of the second vessel 114 via line 138.

The shifted gas stream is cooled in heat exchangers 140 and 142 and the cooled shifted synthesis gas stream fed via line 144 to a third water-gas shift vessel 146 containing a third particulate bed of sulphur-tolerant Co/Mo water-gas shift catalyst 148. The shifted gas stream containing steam further reacts over the catalyst 148 to form carbon dioxide and hydrogen. The third vessel is operated adiabatically without cooling and the exothermic reactions heat the resulting shifted gas stream. The shifted gas stream is recovered from the third water-gas shift vessel 146 and passed via line 150 to heat exchanger 152 where it is cooled. The cooled shifted gas stream is then fed via line 154 to a fourth water-gas shift vessel 156 containing a fourth particulate bed of sulphur-tolerant Co/Mo water-gas shift catalyst 158. The shifted gas stream containing steam further reacts over the catalyst 158 to form carbon dioxide and hydrogen. The fourth vessel is operated adiabatically without cooling and the exothermic reactions heat the resulting shifted gas stream.

The shifted gas stream is recovered from the fourth water-gas shift vessel 156 via line 160 and passed through heat exchanger 162, and optionally further heat exchangers (not shown) to cool the gas below the dew point and so condense the remaining steam. The cooled shifted stream is fed via line 164 to separator 166 in which the condensate is separated from the hydrogen rich shifted gas stream. The dry hydrogen-rich shifted gas stream is recovered from separator 166 via line 168 and the condensate via line 170. The condensate may be used to generate steam for use in the process. The dry hydrogen-rich shifted gas stream 168 may be used in downstream processing or sent to a gas washing unit (not shown) to recover CO2 and H2S and generate a hydrogen rich gas stream product. The carbon dioxide recovered from such processes may be used in carbon-capture and storage (CCS) processes or in enhanced oil recovery (EOR) processes.

In an alternative embodiment, by utilising the collector 120 as the distributor and vice-versa, the synthesis gas 110 may be fed through the tubes 116 in a direction counter-current to the flow of pre-shifted gas through the second water-gas shift vessel 114.

In FIG. 2 the process is modified by steam addition to the synthesis gas before and after heating in the second shift vessel. Accordingly, a synthesis gas 210 containing one or more sulphur compounds with a steam:CO ratio in the range 0.20-0.30 is heated in heat exchanger 212 and mixed with steam from line 214. The steam in line 214 is provided by a boiler-feed water supply 216 heated by heat exchanger 218. Additional steam is supplied to the synthesis gas steam mixture via line 220.

The combined synthesis gas and steam mixture is fed via line 222 to a distributor 224 disposed within a second sour shift vessel 226. The distributor is connected to a plurality of tubes 228 that pass vertically through a bed of particulate Co/Mo sour shift catalyst 230. The synthesis gas steam mixture is able to pass from the distributor vertically through the tubes where it is heated thereby cooling the reactant gases in the catalyst bed 230. The tubes are connected to a collector 232 at the other end of the tubes that collects heated synthesis gas.

The heated synthesis is recovered from the vessel 226 via line 234 and mixed with a further amount of steam from line 236. The synthesis gas steam mixture is passed to heat exchanger 238 where its temperature is adjusted to the desired inlet temperature. The temperature adjusted synthesis gas is fed from exchanger 238 via line 240 to a pre-shift vessel 242 containing a first fixed bed of particulate sulphided Co/Mo sulphur-tolerant water-gas shift catalyst 244. The flow of synthesis gas containing steam is controlled such that the gas hourly space velocity in the first bed of catalyst is >12,500 $h^{-1}$. The synthesis gas containing steam reacts over the catalyst to form carbon dioxide and hydrogen. The pre-shift vessel is operated adiabatically without cooling and the exothermic reactions heat the resulting pre-shifted gas stream.

The pre-shifted gas stream is recovered from the vessel 242 via line 246 and passed through heat exchanger 248 where it is cooled.

The cooled pre-shifted gas stream is then fed via line 250 to the inlet of the second water-gas shift vessel 226 containing the second fixed bed of particulate sulphided Co/Mo sulphur-tolerant water-gas shift catalyst 230. The pre-shifted gas mixture is passed over the water-gas shift catalyst 230 further increasing the hydrogen content of the synthesis gas. The bed of catalyst 230 is cooled in heat exchange with the synthesis gas/steam mixture 222 passing through the tubes 228 in a direction counter-current to the flow of pre-shifted gas stream through the vessel 226. A hydrogen-enriched shifted gas stream is recovered from the outlet of the second vessel 226 via line 252.

The shifted gas stream is cooled in heat exchangers 254 and 256 and the cooled shifted synthesis gas stream fed via line 258 to a third water-gas shift vessel 260 containing a third particulate bed of sulphur-tolerant Co/Mo water-gas shift catalyst 262. The shifted gas stream containing steam further reacts over the catalyst 262 to form carbon dioxide and hydrogen. The third vessel is operated adiabatically without cooling and the exothermic reactions heat the resulting shifted gas stream. The shifted gas stream is recovered from the third water-gas shift vessel 260 and passed via line 264 to heat exchanger 266 where it is cooled. The cooled shifted gas stream is then fed via line 268 to a fourth water-gas shift vessel 270 containing a fourth particulate bed of sulphur-tolerant Co/Mo water-gas shift catalyst 272. The shifted gas stream containing steam further reacts over the catalyst 272 to form carbon dioxide and hydrogen. The fourth vessel is operated adiabatically without cooling and the exothermic reactions heat the resulting shifted gas stream.

The shifted gas stream is recovered from the fourth water-gas shift vessel 270 via line 274 and passed through heat exchanger 276, and optionally further heat exchangers (not shown) to cool the gas below the dew point and so condense the remaining steam. The cooled shifted stream is fed via line 278 to separator 280 in which the condensate is separated from the hydrogen rich shifted gas stream. The dry hydrogen-rich shifted gas stream is recovered from separator 280 via line 282 and the condensate via line 284. The condensate may be used to generate steam for use in the process. The dry hydrogen-rich shifted gas stream 282 may be used in downstream processing or sent to a gas washing unit (not shown) to recover CO2 and H2S and generate a hydrogen rich gas stream product. The carbon dioxide recovered from such processes may be used in carbon-capture and storage (CCS) processes or in enhanced oil recovery (EOR) processes.

In an alternative embodiment, by utilising the collector 232 as the distributor and vice-versa, the synthesis gas/steam mixture 222 may be fed through the tubes 228 in a direction co-current with the flow of pre-shifted gas through the second water-gas shift vessel 226.

The invention is further illustrated by reference to the following calculated Examples.

EXAMPLE 1 (COMPARATIVE)

The calculated mass balance below is for the use of three adiabatic sour shift reactors in series with cooling between reactors to carry out a high degree of shift (>90%) on a feed gas with a steam:CO ratio of 1.35 and an R ratio of 0.37.

| Mol fraction | Reactor 1 | | Reactor 2 | | Reactor 3 | |
|---|---|---|---|---|---|---|
| | In | Out | In | Out | In | Out |
| H2O | 0.38685 | 0.19883 | 0.19883 | 0.14571 | 0.14571 | 0.12987 |
| CO | 0.28383 | 0.09503 | 0.09503 | 0.04190 | 0.04190 | 0.02606 |
| CO2 | 0.08589 | 0.27468 | 0.27468 | 0.32784 | 0.32784 | 0.34369 |
| COS | 0.00015 | 0.00006 | 0.00006 | 0.00002 | 0.00002 | 0.00001 |
| H2S | 0.00545 | 0.00555 | 0.00555 | 0.00559 | 0.00559 | 0.00559 |
| Argon | 0.00583 | 0.00583 | 0.00583 | 0.00583 | 0.00583 | 0.00583 |
| N2 | 0.00665 | 0.00665 | 0.00665 | 0.00665 | 0.00665 | 0.00665 |
| NH3 | 0.00127 | 0.00127 | 0.00127 | 0.00127 | 0.00127 | 0.00127 |
| CH4 | 0.00075 | 0.00114 | 0.00114 | 0.00116 | 0.00116 | 0.00116 |
| H2 | 0.22333 | 0.41095 | 0.41095 | 0.46403 | 0.46403 | 0.47986 |
| Flow kgmols/hr | 31849.7 | 31825.0 | 31825.0 | 31823.0 | 31823.0 | 31823.0 |
| T deg C. | 238 | 439 | 220 | 277 | 220 | 237 |
| P bar abs. | 63.8 | 63 | 61.8 | 61.3 | 60.7 | 60.2 |

There is a large volume of catalyst in the first reactor, with a high exit temperature (~440° C.), giving the potential for undesirable side reactions, including methanation. This situation is exacerbated when the catalyst is new and more active.

EXAMPLE 2

This is an example of the invention according to FIG. 1, based on the same feed flow and composition and overall shift conversion duty as Example 1. The GHSV in the pre-shift vessel (128) is 41000 h$^{-1}$ and the GHSV in the gas-cooled converter (114) is 7500 h$^{-1}$.

| | Reactor 1 | | Reactor 2 | | | |
|---|---|---|---|---|---|---|
| | Stream No | | | | | |
| Mol fraction | 126 In | 132 Out | 136 In Cat | 138 Out Cat | 110 In tubes | 122 Out tubes |
| H2O | 0.38685 | 0.31650 | 0.31650 | 0.19037 | 0.38685 | 0.38685 |
| CO | 0.28383 | 0.21345 | 0.21345 | 0.08637 | 0.28383 | 0.28383 |
| CO2 | 0.08589 | 0.15639 | 0.15639 | 0.28334 | 0.08589 | 0.08589 |

-continued

|  |  |  |  |  |  |  |
|---|---|---|---|---|---|---|
| COS | 0.00015 | 0.00002 | 0.00002 | 0.00004 | 0.00015 | 0.00015 |
| H2S | 0.00545 | 0.00559 | 0.00559 | 0.00557 | 0.00545 | 0.00545 |
| Argon | 0.00583 | 0.00583 | 0.00583 | 0.00583 | 0.00583 | 0.00583 |
| N2 | 0.00665 | 0.00665 | 0.00665 | 0.00665 | 0.00665 | 0.00665 |
| NH3 | 0.00127 | 0.00127 | 0.00127 | 0.00127 | 0.00127 | 0.00127 |
| CH4 | 0.00075 | 0.00082 | 0.00082 | 0.00124 | 0.00075 | 0.00075 |
| H2 | 0.22333 | 0.29350 | 0.29350 | 0.41932 | 0.22333 | 0.22333 |
| Flow kgmols/hr | 31849.7 | 31845.0 | 31845.0 | 31818.0 | 31849.7 | 31849.7 |
| T deg C. | 323 | 398 | 340 | 371.5 | 218 | 323 |
| P bar abs. | 63.8 | 62.8 | 62.5 | 62 | 63.9 | 63.8 |

| | Reactor 3 | | Reactor 4 | |
|---|---|---|---|---|
| | Stream No | | | |
| Mol fraction | 144 In | 150 Out | 154 In | 160 Out |
| H2O | 0.19037 | 0.14567 | 0.14567 | 0.12990 |
| CO | 0.08637 | 0.04165 | 0.04165 | 0.02588 |
| CO2 | 0.28334 | 0.32807 | 0.32807 | 0.34385 |
| COS | 0.00004 | 0.00002 | 0.00002 | 0.00001 |
| H2S | 0.00557 | 0.00559 | 0.00559 | 0.00559 |
| Argon | 0.00583 | 0.00583 | 0.00583 | 0.00583 |
| N2 | 0.00665 | 0.00665 | 0.00665 | 0.00665 |
| NH3 | 0.00127 | 0.00127 | 0.00127 | 0.00127 |
| CH4 | 0.00124 | 0.00126 | 0.00126 | 0.00126 |
| H2 | 0.41932 | 0.46399 | 0.46399 | 0.47975 |
| Flow kgmols/hr | 31818.0 | 31817.0 | 31817.0 | 31817.0 |
| T deg C. | 230 | 278 | 220 | 237 |
| P bar abs. | 61.4 | 60.4 | 60.1 | 59.1 |

This process overcomes the problem of the high temperature seen in example 1. The peak temperatures in shift stages 1 and 2 are about 400° C. and 375° C. respectively. Due to the fact that the temperature profile in stage 2 better follows that which is optimal for a high water-gas shift reaction rate, the combined catalyst volume for reactors 1 and 2 in this case is actually about 15% less than the volume of catalyst in reactor 1 in example 1, whereas the CO conversion is actually slightly higher.

EXAMPLE 3

This is an example of the invention according to FIG. 2. The syngas feed (steam:CO=0.21 and R=0.45) is preheated and some steam is added before it is fed to the tubes of the second shift reactor, where it flows counter-current to the reactant gas flow, thereby cooling it. The heated gas from the tubes is then cooled and mixed with further steam to give a steam:CO ratio of about 1.1. The synthesis gas containing steam is then passed to the first pre-shift reactor. The pre-shifted gas is cooled before passing it to the second (cooled) reactor. The shifted gas from the second shift stage flows to reactors 3 and 4 with cooling before each stage, such that an overall CO conversion of about 92% is achieved. The peak temperature in each of the first two reactors is about 420° C. The GHSV in the pre-shift vessel (242) is 43000 $h^{-1}$ and the GHSV in the gas-cooled converter (226) is 6200 $h^{-1}$.

| | Feed | Reactor 1 | | | Reactor 2 | | |
|---|---|---|---|---|---|---|---|
| | | Stream No | | | | | |
| Mol fraction | 210 | 240 In | 246 Out | 250 In Cat | 252 Out Cat | 222 In tubes | 234 Out tubes |
| H2O | 0.11546 | 0.39488 | 0.30714 | 0.30714 | 0.14146 | 0.25311 | 0.25311 |
| CO | 0.52476 | 0.35899 | 0.27166 | 0.27166 | 0.10579 | 0.44310 | 0.44310 |
| CO2 | 0.01937 | 0.01325 | 0.10101 | 0.10101 | 0.26683 | 0.01636 | 0.01636 |
| COS | 0.00064 | 0.00044 | 0.00001 | 0.00001 | 0.00004 | 0.00054 | 0.00054 |
| H2S | 0.00744 | 0.00509 | 0.00551 | 0.00551 | 0.00548 | 0.00628 | 0.00628 |
| Argon | 0.00891 | 0.00609 | 0.00609 | 0.00609 | 0.00609 | 0.00752 | 0.00752 |
| N2 | 0.05371 | 0.03674 | 0.03674 | 0.03674 | 0.03675 | 0.04535 | 0.04535 |
| NH3 | 0.00303 | 0.00207 | 0.00207 | 0.00207 | 0.00207 | 0.00256 | 0.00256 |
| CH4 | 0.00037 | 0.00025 | 0.00026 | 0.00026 | 0.00034 | 0.00031 | 0.00031 |
| H2 | 0.26633 | 0.18219 | 0.29350 | 0.29350 | 0.43515 | 0.22488 | 0.22488 |
| Flow kgmols/hr | 19880 | 29060.0 | 29060.0 | 29060.0 | 29055.0 | 23544.0 | 23544.0 |
| T deg C. | 145 | 320 | 419 | 305 | 367 | 175 | 340 |
| P bar abs | 38.9 | 38.6 | 37.8 | 37.5 | 36.5 | 38.9 | 38.8 |

-continued

|  | Reactor 3 | | Reactor 4 | |
|---|---|---|---|---|
|  | | Stream No | | |
| Mol fraction | 258 In | 264 Out | 268 In | 274 Out |
| $H_2O$ | 0.14146 | 0.08205 | 0.08205 | 0.06569 |
| CO | 0.10579 | 0.04638 | 0.04638 | 0.03004 |
| $CO_2$ | 0.26683 | 0.32625 | 0.32625 | 0.34260 |
| COS | 0.00004 | 0.00003 | 0.00003 | 0.00002 |
| $H_2S$ | 0.00548 | 0.00550 | 0.00550 | 0.00551 |
| Argon | 0.00609 | 0.00609 | 0.00609 | 0.00609 |
| $N_2$ | 0.03675 | 0.03675 | 0.03675 | 0.03675 |
| $NH_3$ | 0.00207 | 0.00207 | 0.00207 | 0.00207 |
| $CH_4$ | 0.00034 | 0.00034 | 0.00034 | 0.00034 |
| $H_2$ | 0.43515 | 0.49455 | 0.49455 | 0.51089 |
| Flow kgmols/hr | 29055.0 | 29055.0 | 29055.0 | 29055.0 |
| T deg C. | 190 | 259 | 190 | 209 |
| P bar abs. | 35.9 | 34.9 | 34.6 | 33.7 |

EXAMPLE 4 (COMPARATIVE)

This is an example according to WO2010/013026 based on the same feed flow and composition, total steam addition and shift conversion duty as Example 3. The catalyst volume in the cooled first shift reactor is approximately the same as the combined volume of the pre-shift and second shift reactor in Example 3. The synthesis gas feed (steam:CO=0.21 and R=0.45) is preheated and some steam is added before it is fed to the tubes of the cooled shift reactor, where it flows co-current to the reactant gas flow, thereby cooling it. The heated gas from the tubes is cooled in an external heat exchanger and mixed with further steam to give a steam:CO ratio of about 1.1, before being fed to the catalyst.

In comparison to Example 3, there is the same CO conversion in the cooled reactor as the total conversion of the first two reactors in Example 3. However, the peak temperature (part way down the catalyst bed) is about 440° C., which means a higher potential for side reactions to occur.

EXAMPLE 5

This is an example of the invention according to FIG. 2, except that that shift reactor stages 3 and 4 are omitted in order to produce a shifted synthesis gas stream suited to methanol synthesis.

The syngas feed (steam:CO=0.15 and R=0.45) is split into a main flow and bypass flow. The main flow (91%) is preheated and is fed to the tubes of the second shift reactor, where it flows co-current to the reactant gas flow, thereby cooling it. The heated gas from the tubes is then cooled and mixed with steam to give a steam:CO ratio of about 0.82 and then passes to the first (pre-shift reactor). The pre-shifted gas is cooled before passing to the second (cooled) reactor. The overall conversion of CO in the gas passing through the two shift reactors is about 60%. The shifted gas leaving the second stage is cooled and mixed with the un-shifted by-pass syngas feed stream.

This combined stream is further cooled to condense water, which is removed as condensate, before being fed to an Acid Gas Removal unit to remove $CO_2$ and sulphur compounds to make a gas with a suitable composition to utilise for methanol synthesis.

|  | | Reactor 1 | | | |
|---|---|---|---|---|---|
| Mol fraction | Syngas feed | In Cat | Out Cat | In tubes | Out tubes |
| $H_2O$ | 0.115458 | 0.394882 | 0.141644 | 0.253105 | 0.253105 |
| CO | 0.524758 | 0.358989 | 0.105823 | 0.443099 | 0.443099 |
| $CO_2$ | 0.019371 | 0.013252 | 0.26675 | 0.016356 | 0.016356 |
| COS | 0.000643 | 0.00044 | 7.02E−05 | 0.000543 | 0.000543 |
| $H_2S$ | 0.007436 | 0.005087 | 0.005458 | 0.006279 | 0.006279 |
| Argon | 0.008905 | 0.006092 | 0.006094 | 0.007519 | 0.007519 |
| $N_2$ | 0.053706 | 0.03674 | 0.036751 | 0.045349 | 0.045349 |
| $NH_3$ | 0.003029 | 0.002072 | 0.002073 | 0.002558 | 0.002558 |
| $CH_4$ | 0.000367 | 0.000251 | 0.000395 | 0.00031 | 0.00031 |
| $H_2$ | 0.266327 | 0.182195 | 0.434942 | 0.224883 | 0.224883 |
| Flow kgmols/hr | 19880 | 29060.0 | 29052.0 | 23544.0 | 23544.0 |
| T deg C. | 145 | 305 | 425 | 175 | 391 |
| P bar abs. | 38.9 | 37.6 | 36.5 | 38.9 | 38.8 |

| Mol fraction | Syngas feed 210 | Reactor 1 | | Stream No 250 In Cat | Reactor 2 | | |
|---|---|---|---|---|---|---|---|
| | | 240 In Cat | 246 Out Cat | | 252 Out Cat | 222 In tubes | 234 Out tubes |
| H2O | 0.082934 | 0.326045 | 0.21593 | 0.21593 | 0.08453 | 0.082934 | 0.082934 |
| CO | 0.544064 | 0.399835 | 0.29016 | 0.29016 | 0.15881 | 0.544064 | 0.544064 |
| CO2 | 0.020081 | 0.014757 | 0.12490 | 0.12490 | 0.25630 | 0.020081 | 0.020081 |
| COS | 0.000666 | 0.000489 | 0.00002 | 0.00002 | 0.00011 | 0.000666 | 0.000666 |
| H2S | 0.007703 | 0.005661 | 0.00613 | 0.00613 | 0.00604 | 0.007703 | 0.007703 |
| Argon | 0.009232 | 0.006785 | 0.00679 | 0.00679 | 0.00679 | 0.009232 | 0.009232 |
| N2 | 0.055682 | 0.040921 | 0.04092 | 0.04092 | 0.04095 | 0.055682 | 0.055682 |
| NH3 | 0.003133 | 0.002302 | 0.00230 | 0.00230 | 0.00230 | 0.003133 | 0.003133 |
| CH4 | 0.000381 | 0.00028 | 0.00029 | 0.00029 | 0.00047 | 0.000381 | 0.000381 |
| H2 | 0.276124 | 0.202925 | 0.31257 | 0.31257 | 0.44369 | 0.276124 | 0.276124 |
| Flow kgmols/hr | 19174 | 23741.0 | 23741.0 | 23741.0 | 23741.0 | 17447 | 17447 |
| T deg C. | 131 | 290 | 418 | 390 | 412 | 200 | 392 |
| P bar abs. | 38.9 | 38.3 | 38 | 37.8 | 37.3 | 38.6 | 38.5 |

The invention claimed is:

1. A process for increasing the hydrogen content of a synthesis gas containing one or more sulphur compounds, said synthesis gas comprising hydrogen, carbon oxides and steam, and having a ratio, R, defined as $R=(H_2-CO_2)/(CO+CO_2)<0.6$ and a steam to carbon monoxide ratio $\leq 1.8$, comprising the steps of (i) heating the synthesis gas, (ii) passing at least a portion of the heated synthesis gas adiabatically through a first bed of sulphur-tolerant water-gas shift catalyst disposed in a first shift vessel at a gas hourly space velocity $\geq 12{,}500\ \text{hour}^{-1}$ to form a pre-shifted gas stream to convert 10 to 40% by moles of the carbon monoxide present in the synthesis gas to carbon dioxide, and (iii) forming a shifted gas stream by subjecting at least a portion of the pre-shifted gas stream to a second stage of water-gas shift in a second shift vessel containing a second bed of sulphur-tolerant water-gas shift catalyst that is cooled in heat exchange with a gas stream comprising the synthesis gas.

2. The process according to claim 1 wherein the synthesis gas containing one or more sulphur compounds is formed by gasification of a carbonaceous feedstock at elevated temperature and pressure, followed by cooling and washing the resulting gas stream to remove particulate material.

3. The process according to claim 2 wherein the gasification is performed on a coal powder or aqueous slurry in a gasifier using oxygen or air and in the presence of steam at a pressure up to about 85 bar abs and an exit temperature up to 1450° C.

4. The process according to claim 2 wherein the steam to carbon monoxide ratio is in the range 0.2 to 1.8.

5. The process according to claim 2 wherein the R ratio is in the range 0.1 to 0.6.

6. The process according to claim 2 wherein the R ratio is in the range 0.2 to 0.6.

7. The process according to claim 1 wherein the heated synthesis gas is divided into first and second streams, with the first stream passed over the first bed of shift catalyst and the second stream by-passing the first bed of shift catalyst, thereby forming a catalyst by-pass stream.

8. The process according to claim 7 wherein the by-pass stream is fed to one or more of the pre-shifted gas stream, the shifted gas stream, or separately to downstream processes.

9. The process according to claim 1 wherein the space velocity of the synthesis gas flowing through the first bed of sulphur-tolerant water-gas shift catalyst is $\geq 15{,}500\ \text{hour}^{-1}$.

10. The process according to claim 1 wherein the inlet temperature for the first bed of water-gas shift catalyst is in the range 190 to 350° C.

11. The process according to claim 1 wherein the synthesis gas is heated by passing it through a plurality of tubes, coils or plates disposed within the second catalyst bed.

12. The process according to claim 1 wherein the synthesis gas is subjected to the water-gas shift reaction over a supported cobalt-molybdenum water-gas shift catalyst.

13. The process according to claim 1 wherein the water-gas shift reaction over the first bed of water-gas shift catalyst is performed at a temperature in the range 190 to 420° C.

14. The process according to claim 1 wherein the second stage of water-gas shift is performed in a vessel containing a supported cobalt-molybdenum water-gas shift catalyst.

15. The process according to claim 1 wherein the second stage of water gas shift is performed at a temperature in the range 250 to 420° C.

16. The process according to claim 1 wherein the space velocity in the second bed of sulphur-tolerant water-gas shift catalyst is $\geq 6000\ \text{h}^{-1}$.

17. The process according to claim 1 wherein the second shift vessel comprises tubes, and the synthesis gas is passed through the tubes in the second shift vessel in a direction that is counter-current or co-current to the flow of the pre-shifted gas stream through the vessel.

18. The process according to claim 1 wherein the shifted gas stream is subjected to one or more further water-gas shift stages.

19. The process according to claim 1 further comprising the steps of:
   (i) cooling a shifted gas stream obtained from the one or more further stages of water-gas shift, or a mixture of the shifted gas stream and a bypass stream, to below the dew point to condense water,
   (ii) separating the resulting condensate therefrom to form a dry shifted gas stream,
   (iii) feeding the dry shifted gas stream to a gas-washing unit operating by means of counter-current solvent flow, to produce a product synthesis gas enriched in hydrogen and
   (iv) collecting the product synthesis gas from the washing unit.

20. The process according to claim 1 wherein the space velocity of the synthesis gas flowing through the first bed of sulphur-tolerant water-gas shift catalyst is $\geq 17{,}500\ \text{hour}^{-1}$.

21. The process according to claim 1 wherein the space velocity of the synthesis gas flowing through the first bed of sulphur-tolerant water-gas shift catalyst is $\geq 20{,}000\ \text{hour}^{-1}$.

22. The process according to claim 1 wherein the space velocity in the second bed of sulphur-tolerant water-gas shift catalyst is in the range $6000\ \text{h}^{-1}$ to $12000\ \text{h}^{-1}$.

* * * * *